United States Patent
Choi et al.

(10) Patent No.: US 12,214,695 B2
(45) Date of Patent: Feb. 4, 2025

(54) VEHICLE BATTERY MANAGEMENT SYSTEM

(71) Applicant: DRIVETECH CO., LTD., Gyeonggi-do (KR)

(72) Inventors: Yun Yong Choi, Gyeonggi-do (KR); Myeong Gyun Choi, Gimpo (KR)

(73) Assignee: DRIVETECH CO., LTD., Gyeonggi-do (KR)

( * ) Notice: Subject to any disclaimer, the term of this patent is extended or adjusted under 35 U.S.C. 154(b) by 305 days.

(21) Appl. No.: 18/073,122

(22) Filed: Dec. 1, 2022

(65) Prior Publication Data

US 2023/0406150 A1     Dec. 21, 2023

(30) Foreign Application Priority Data

Jun. 21, 2022 (KR) .................. 10-2022-0075470

(51) Int. Cl.
    *B60L 58/12*         (2019.01)
    *B60L 58/18*         (2019.01)
    *H02J 7/00*          (2006.01)

(52) U.S. Cl.
    CPC ............... *B60L 58/12* (2019.02); *B60L 58/18* (2019.02); *H02J 7/0048* (2020.01); *H02J 7/0063* (2013.01)

(58) Field of Classification Search
    CPC .......... B60L 58/12; B60L 58/18; B60L 58/13; B60L 58/21; B60L 2240/622; B60L 1/00;

(Continued)

(56) References Cited

U.S. PATENT DOCUMENTS

| | | | | |
|---|---|---|---|---|
| 10,807,499 | B2 * | 10/2020 | Lee .................. | B60L 58/12 |
| 2013/0054069 | A1 * | 2/2013 | Komiya ............. | B60L 58/18 |
| | | | | 701/22 |

(Continued)

FOREIGN PATENT DOCUMENTS

| | | |
|---|---|---|
| JP | 2015-033258 A | 2/2015 |
| JP | 2021-034271 A | 3/2021 |

(Continued)

OTHER PUBLICATIONS

Kempton et al., W. Electric Vehicles as a New Power Source for Electric Utilities, Google Scholar, Elsevier Science, Transportation Research, vol. 2, No. 1, Sep. 1997, pp. 157-175. (Year: 1997).*

*Primary Examiner* — Russell Frejd
(74) *Attorney, Agent, or Firm* — Locke Lord LLP; Scott D. Wofsy; Gabrielle L. Gelozin

(57) ABSTRACT

The present disclosure provides a vehicle battery management system. In a vehicle battery management system including a battery unit configured to supply power to an electric vehicle, and a controller configured to control the battery unit, the battery unit is divided into a first battery unit and a second battery unit, the first battery unit supplies power to a motor for generating driving force of the electric vehicle, the second battery unit supplies power to an outside of the electric vehicle, the controller performs a control operation so that power supplied from the first battery unit is supplied to the outside of the electric vehicle or power supplied from the second battery unit is supplied to the motor based on an SOC of each of the first battery unit and the second battery unit and state information of the electric vehicle.

17 Claims, 5 Drawing Sheets

(58) Field of Classification Search
CPC ...... B60L 53/11; B60L 53/305; B60L 53/665; B60L 50/53; B60L 50/60; B60L 50/66; B60L 2260/22; B60L 2260/52; H02J 7/0048; H02J 7/0063; Y02T 10/70; Y02T 10/7072; Y02T 10/72; Y02T 90/12; Y02T 90/167; B60K 1/04; B60Y 2200/01
See application file for complete search history.

(56) References Cited

U.S. PATENT DOCUMENTS

| | | | | |
|---|---|---|---|---|
| 2014/0062398 | A1* | 3/2014 | Satake | B60L 3/0046 |
| | | | | 320/109 |
| 2015/0137594 | A1* | 5/2015 | Yamazaki | H02J 7/345 |
| | | | | 307/10.1 |
| 2017/0305410 | A1* | 10/2017 | Kinomura | B60W 20/13 |
| 2020/0298820 | A1* | 9/2020 | Shokaku | B60W 20/00 |
| 2021/0247450 | A1* | 8/2021 | Ito | H01M 10/44 |
| 2022/0032898 | A1* | 2/2022 | Miyazato | B60W 30/182 |
| 2023/0211699 | A1* | 7/2023 | Lee | B60L 53/80 |
| | | | | 701/22 |
| 2024/0356447 | A1* | 10/2024 | D'Authier | H02M 3/33571 |

FOREIGN PATENT DOCUMENTS

| | | |
|---|---|---|
| KR | 10-2017-0114148 A | 10/2017 |
| KR | 10-2017-0133763 A | 12/2017 |
| KR | 10-2019-0057471 A | 5/2019 |
| KR | 10-2021-0029424 A | 3/2021 |

\* cited by examiner

VEHICLE BATTERY MANAGEMENT SYSTEM

CROSS-REFERENCE TO RELATED APPLICATION

This application claims, under 35 U.S.C. § 119(a), the benefit of and priority to Korean Patent Application No. 10-2022-0075470 filed on Jun. 21, 2022, the entire contents of which are incorporated herein by reference.

BACKGROUND

(a) Technical Field

The present disclosure relates to a vehicle battery management system for controlling power used to drive an electric vehicle and supply power to the outside of the electric vehicle using two vehicle batteries.

(b) Background Art

An electric vehicle is a vehicle using electric energy as a power source, and has been continuously developed and commercialized as an eco-friendly means of transportation that may replace a vehicle using fossil fuels. Since an internal battery of the electric vehicle provides power required for driving, a range of the electric vehicle may be determined based on the capacity of the battery. Accordingly, in order to easily utilize the electric vehicle in various industries and business sites, it is necessary to provide a battery capable of exhibiting a certain performance or more according to an industrial environment.

An electric vehicle used in various industrial sites may serve to supply power to other electric vehicles or to the outside. The electric vehicle used in various industrial sites is likely to be mainly used to supply power to external equipment rather than driving. However, a typical electric vehicle is not divided into a battery used for vehicle driving and a battery required for external power supply. Accordingly, there is a problem in that a user has difficulty in detecting the remaining amount of the battery that rapidly changes when external power is supplied, and power required for driving the vehicle may not remain in the battery due to excessive external power supply.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

A technical object of the present disclosure is to provide a vehicle battery management system for controlling power used to drive an electric vehicle and supply power to the outside of the electric vehicle using two vehicle batteries.

Another technical object of the present disclosure is to provide a vehicle battery management system for controlling a battery of an electric vehicle that drives in a specified space and supplies power required for work.

In one aspect, a vehicle battery management system includes a battery unit configured to supply power to an electric vehicle, and a controller configured to control the battery unit, in which the battery unit is divided into a first battery unit and a second battery unit, the first battery unit supplies power to a motor for generating driving force of the electric vehicle, the second battery unit supplies power to an outside of the electric vehicle, the controller performs a control operation so that power supplied from the first battery unit is supplied to the outside of the electric vehicle or power supplied from the second battery unit is supplied to the motor based on a state of charge (SOC) of each of the first battery unit and the second battery unit and state information of the electric vehicle, and the state information of the electric vehicle includes whether the electric vehicle is being driven, whether the electric vehicle is stopped, and a distance between the electric vehicle and an electric charging station.

In a preferred embodiment, the first battery unit and the second battery unit may be configured as separate battery packs.

In another preferred embodiment, the first battery unit and the second battery unit may be configured as separate modules in one battery pack.

In still another preferred embodiment, the second battery unit may supply power to a logistics robot outside the electric vehicle and another vehicle.

In yet another preferred embodiment, the controller may supply power supplied from the second battery unit to the motor or the first battery unit upon determining that the SOC of the first battery unit is insufficient in consideration of a range of the electric vehicle and a distance between a current location of the electric vehicle and a destination, and the range may be determined based on the SOC of the first battery unit.

In still yet another preferred embodiment, when a destination of the electric vehicle is the electric charging station, the controller may supply power supplied from the second battery unit to the first battery unit or the motor.

In a further preferred embodiment, when a destination of the electric vehicle is not the electric charging station, the controller may calculate an amount of power required for the electric vehicle to reach the destination, and the controller may supply power supplied from the second battery unit to the first battery unit until the SOC of the first battery unit reaches the amount of power.

In another further preferred embodiment, when a destination of the electric vehicle is not the electric charging station, the controller may calculate an amount of power required for the electric vehicle to reach the destination, and the controller may compare the SOC of the first battery unit with the amount of power and supply an insufficient amount of power from the second battery unit to the motor.

In still another further preferred embodiment, in a state in which the second battery unit supplies power to the outside of the electric vehicle, the controller may determine a lower limit of charging of the first battery unit determined in consideration of a range of the electric vehicle and a distance between a current location of the electric vehicle and the electric charging station, the range may be determined based on the SOC of the first battery unit, and the lower limit of charging may be determined based on a minimum amount of power required for the electric vehicle to reach the electric charging station.

In yet another further preferred embodiment, the controller may supply power supplied from the first battery unit to the second battery unit or the outside of the electric vehicle until the SOC of the first battery unit reaches the lower limit of charging.

In still yet another further preferred embodiment, the vehicle battery management system may further include a location recognition device configured to acquire information on a current location of the electric vehicle, and a communication module configured to receive information on a location of the electric charging station, in which the controller may determine a distance between a current location of the electric vehicle and the electric charging station based on information received from the location recognition device and the communication module.

In a still further preferred embodiment, the communication module may receive information on locations of a plurality of electric charging stations, and the controller may calculate a distance between each of the plurality of electric charging stations and the current location of the electric vehicle, and an amount of power required when the electric vehicle reaches each of the plurality of electric charging stations.

In a yet still further preferred embodiment, the vehicle battery management system may further include a communication module configured to transmit the SOC of each of the first battery unit and the second battery unit of the electric vehicle to an integrated control center.

In a yet still further preferred embodiment, the integrated control center may monitor an SOC of each of a plurality of electric vehicles and a location of each of a plurality of provided electric charging stations in real time, and the integrated control center may transmit a signal for a driving route for charging to the electric vehicles in consideration of an SOC of the first battery unit of each of the electric vehicles and the locations of the electric charging stations.

In a yet still further preferred embodiment, the controller may share the SOC of the first battery unit with controllers of other electric vehicles within a preset distance.

In a yet still further preferred embodiment, the controllers may allocate the electric vehicles to a plurality of electric charging stations in consideration of the SOC of the first battery unit of each of the electric vehicles and locations of the electric charging stations.

In a yet still further preferred embodiment, each of the controllers may provide information on the SOC of the first battery unit to other surrounding controllers when the electric vehicles are started.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
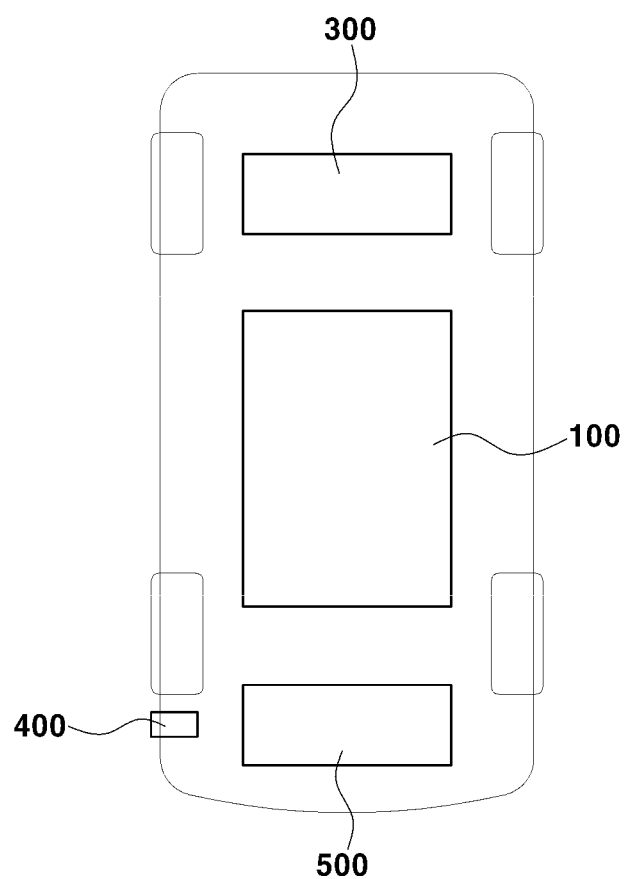
FIG. 1 is a diagram illustrating an electric vehicle according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Advantages and features of the present disclosure, and a method for achieving the advantages and features will become apparent with reference to the embodiments described below in detail in conjunction with the accompanying drawings. However, the present disclosure is not limited to the embodiments disclosed below, and may be implemented in various different forms. This embodiment is only provided so that the disclosure of the present disclosure is complete, and to completely inform those of ordinary skill in the art to which the present disclosure pertains of the scope of the disclosure, and the present disclosure is only defined by the scope of the claims. Like reference numerals refer to like elements throughout the specification.

In addition, a term such as " . . . part", " . . . unit", " . . . module", etc. described in the specification means a unit that processes at least one function or operation, which may be implemented as hardware, software, or a combination of hardware and software.

In addition, in the specification, names of components are divided using first, second, etc. to distinguish the names of the components since the names are the same, and the order is not necessarily limited in the following description.

The detailed description is illustrative of the disclosure. In addition, the above description shows and describes preferred embodiments of the present disclosure, and the present disclosure may be used in various other combinations, modifications, and environments. That is, changes or modifications are possible within the scope of the concept of the disclosure disclosed herein, the scope equivalent to the described disclosure, and/or the scope of skill or knowledge in the art. The embodiments describe the best state for implementing the technical idea of the present disclosure, and various changes required in specific application fields and uses of the present disclosure are possible. Accordingly, the detailed description of the present disclosure is not intended to limit the present disclosure to the disclosed embodiments. In addition, the appended claims should be construed as including other embodiments.

Figure 2:
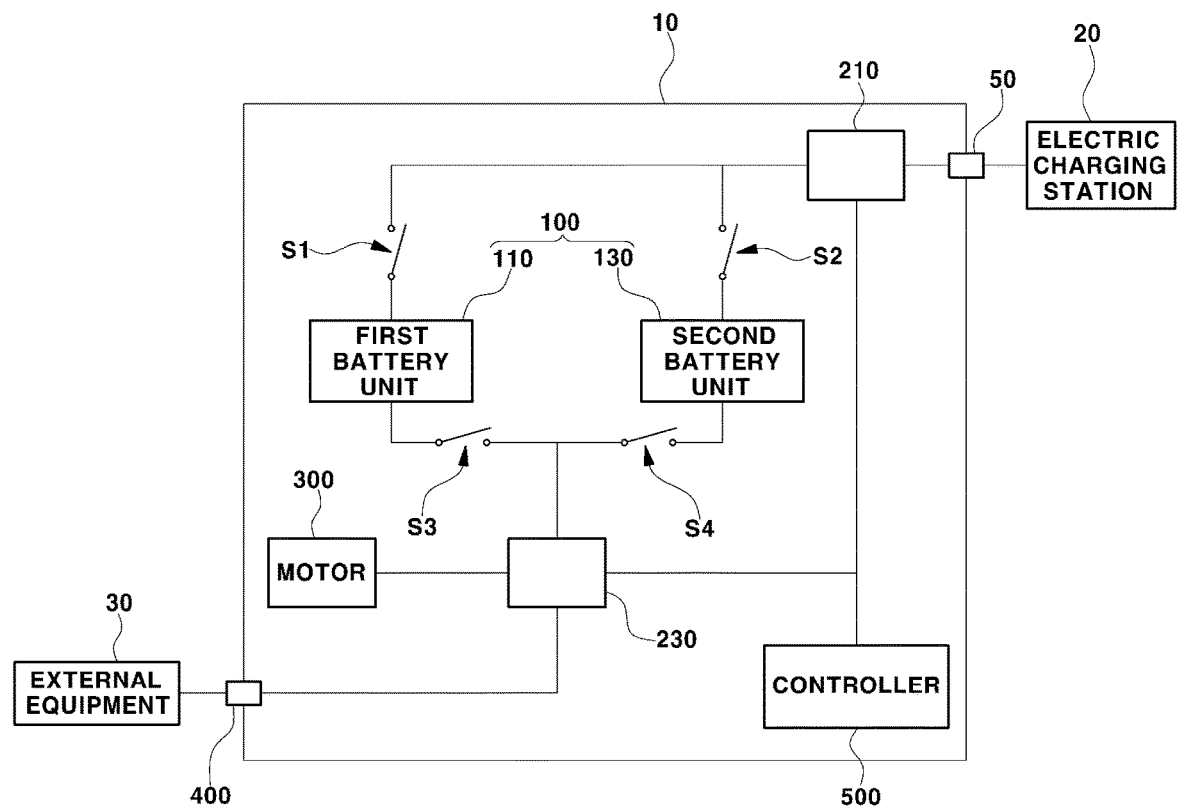
FIG. 2 is a diagram illustrating a vehicle battery management system according to an embodiment of the present disclosure.

FIG. 1 is a diagram illustrating an electric vehicle according to an embodiment of the present disclosure, and FIG. 2 is a diagram illustrating a vehicle battery management system according to an embodiment of the present disclosure.

Referring to FIGS. 1 and 2, the vehicle battery management system may include a battery unit 100, a charging device 210, a power distribution device 230, a motor 300, and a controller 500. The vehicle battery management system according to an embodiment of the present disclosure may be applied to a pure electric vehicle (EV). An electric vehicle 10 according to an embodiment of the present disclosure may be limited to that used in a specified large complex space such as a logistics warehouse, a resort, a golf course, an industrial complex, an airport, a port, a smart farm, or a smart city. In other words, the electric vehicle 10 may be operated within a specified space, and the specified space may refer to a specified large complex space such as a logistics warehouse, a resort, a golf course, an industrial complex, an airport, a port, a smart farm, or a smart city. The electric vehicle 10 may be driven based on information obtained from various infrastructure arranged in the specified space.

The battery unit 100 may store power required for driving of the electric vehicle 10 and power supplied to the outside of the electric vehicle 10. For example, supplying power to the outside of the electric vehicle 10 may include supplying power to a work lamp, an electric appliance, a robotic arm, and an auxiliary vehicle, etc., which are attachments attached to the electric vehicle 10 rather than power required for driving the electric vehicle 10. In addition, supplying power to the outside of the electric vehicle 10 may include supplying power to various devices requiring power in a work space. The battery unit 100 may be divided into a first battery unit 110 and a second battery unit 130. Mainly, the first battery unit 110 may supply power to the motor 300 that generates driving force of the electric vehicle 10. Mainly, the second battery unit 130 may supply power to the outside of the electric vehicle 10. However, depending on the state of the electric vehicle 10, power stored in the first battery unit 110 may be supplied to the outside of the electric vehicle 10, and power stored in the second battery unit 130 may be used for driving the vehicle.

The first battery unit 110 and the second battery unit 130 may be high-voltage batteries. The electric vehicle 10 of the present disclosure may perform functions for driving within a specified space and supplying power to the outside of the electric vehicle 10. Accordingly, a high-voltage battery may be divided into two batteries, one high-voltage battery may be set as a driving battery, and the other high-voltage battery may be set as a working battery. For example, the first battery unit 110 and the second battery unit 130 may be lithium-ion batteries. However, the type of battery is not particularly limited. As an example, the first battery unit 110 and the second battery unit 130 may be configured as separate battery packs. The first battery unit 110 and the second battery unit 130 may be separate components and disposed in different spaces within the electric vehicle 10. Accordingly, for charging, a path of power supplied to each of the first battery unit 110 and the second battery unit 130 may be controlled. As another example, the first battery unit 110 and the second battery unit 130 may be configured as separate modules in one battery pack. That is, in one battery pack, a battery for driving and a battery for external supply may be distinguished from each other. However, the first battery unit 110 and the second battery unit 130 may be batteries other than the high-voltage batteries.

The charging device 210 may supply a DC voltage to each of the first battery unit 110 and the second battery unit 130. As an example, the charging device 210 may boost a DC voltage supplied through a charging terminal 50 into a high DC voltage, output the DC voltage, and supply the DC voltage to the battery unit 100. As another example, the charging device 210 may convert an AC voltage supplied through the charging terminal 50 into a DC voltage and supply the DC voltage to the battery unit 100. In this instance, the charging device 210 may be a part of an on-board charger (OBC).

The power distribution device 230 may distribute power supplied from the first battery unit 110 and the second battery unit 130 to the motor 300 or an external terminal 400. For example, the power distribution device 230 may include an inverter or a converter. Power supplied to the external terminal 400 may be supplied to as another vehicle or external equipment of the electric vehicle 10 such a logistics robot.

The controller 500 may control the charging device 210 and the power distribution device 230. The controller 500 may control the charging device 210 to determine the order of supplying power for charging to the first battery unit 110 and the second battery unit 130. The controller 500 may control the power distribution device 230 based on state information of the electric vehicle 10 to distribute power supplied from the first battery unit 110 and the second battery unit 130 to the motor 300 or the external terminal 400. The controller 500 may control switches S1, S2, S3, and S4 to control paths of power supplied to the first battery unit 110 and the second battery unit 130 and power supplied from the first battery unit 110 and the second battery unit 130.

The controller 500 may monitor an SOC of each of the first battery unit 110 and the second battery unit 130 in real time. The controller 500 may calculate a range of the electric vehicle 10 based on the SOC of the first battery unit 110. The controller 500 may calculate the amount of power that can be supplied to external equipment 30 based on the SOC of the second battery unit 130. The controller 500 may perform a control operation to supply power supplied from the first battery unit 110 to the outside of the electric vehicle 10 or supply power supplied from the second battery unit 130 to the motor 300 based on the SOC of each of the first battery unit 110 and the second battery unit 130 and the state information of the electric vehicle 10. The outside of the electric vehicle 10 may refer to the external equipment 30. The state information of the electric vehicle 10 may include whether the electric vehicle 10 is being driven, whether the electric vehicle 10 is stopped, a current location of the electric vehicle 10, and a distance between the electric vehicle and an electric charging station 20.

The controller 500 may determine whether the SOC of the first battery unit 110 is insufficient compared to the amount of power required for driving the electric vehicle 10. When the SOC of the first battery unit 110 is insufficient compared to the amount of power required for driving the electric vehicle 10, the controller 500 may control the power distribution device 230 so that power stored in the second battery unit 130 is supplied to the first battery unit 130 or the motor 300. Upon determining that the SOC of the first battery unit 110 is insufficient based on the range of the electric vehicle 10 and a distance between the current location of the electric vehicle 10 and a destination, the controller 500 may perform a control operation so that power stored in the first battery unit 130 is supplied to the first battery unit 130 or the motor 300. The range may be determined based on the SOC of the first battery unit 110.

As an example, when the destination of the electric vehicle 10 is the electric charging station 20, the controller 500 may supply power supplied from the second battery unit 130 to the first battery unit 110 or the motor 300.

As another example, when the destination of the electric vehicle 10 is not the electric charging station 20, the controller 500 may calculate the amount of power required for the electric vehicle 10 to reach the destination. The controller 500 may supply power supplied from the second battery unit 130 to the first battery unit 110 until the SOC of the first battery unit 110 reaches the amount of power. That is, when the destination is the electric charging station 20, even if the second battery unit 130 is discharged, a special problem does not occur. However, when the destination is a work space other than the electric charging station 20, the second battery unit 130 needs to supply power to the external equipment 30. Thus, the controller 500 may supply power supplied from the second battery unit 130 to the first battery unit 110 in order to satisfy the amount of power required for the electric vehicle 10 to reach the destination.

When power stored in the second battery unit 130 is supplied to the external equipment 30, the controller 500 may control the power distribution device 230 so that power stored in the first battery unit 110 is supplied to the second battery unit 130 or supplied directly to the external equipment 30. In this instance, the controller 500 may determine a lower limit of charging of the SOC of the first battery unit 110 in consideration of the range of the electric vehicle 10 and the distance between the electric vehicle 10 and the electric charging station 20. The range may be determined based on the SOC of the first battery unit 110. The controller 500 may perform a control operation to supply power supplied from the first battery unit 110 to an external port 400 for supplying power to the second battery unit 130 or the external equipment 30 until the SOC of the first battery unit 110 reaches the lower limit of charging. The lower limit of charging may be determined based on the minimum amount of power required for the electric vehicle 10 to reach the electric charging station 20. That is, the controller 500 may perform a control operation to supply remaining power of the first battery unit 110 excluding the amount of power required for the electric vehicle 10 to reach the electric charging station 20 to the second battery unit 130 or the external port 400.

According to an embodiment of the present disclosure, the user may use the electric vehicle 10 for various purposes by dividing a battery into a battery required for driving the electric vehicle 10 and a battery required for work. In addition, since the battery is divided into the battery required for driving and the battery required for work, it is possible to solve a problem in that the remaining amount of the battery is rapidly changed or it is difficult to clearly determine the remaining amount of the battery when power is supplied to the outside. In other words, even when power stored in the battery required for work is used, the range of the electric vehicle 10 may not change, and thus the user may smoothly control a degree at which the electric vehicle 10 is put into a work site.

According to an embodiment of the present disclosure, a subject to which power stored in the first battery unit 110 and the second battery unit 130 is supplied may be determined in consideration of the distance between the electric vehicle 10 and the destination, the type of destination, and the SOC of the battery unit 100. Accordingly, when the power stored in the battery unit 100 is sufficient, power may be distributed according to uses of the first battery unit 110 and the second battery unit 130, and when the power stored in the battery unit 100 is insufficient, power distribution/supply between the first battery unit 110 and the second battery unit 130 may be controlled.

Figure 3:
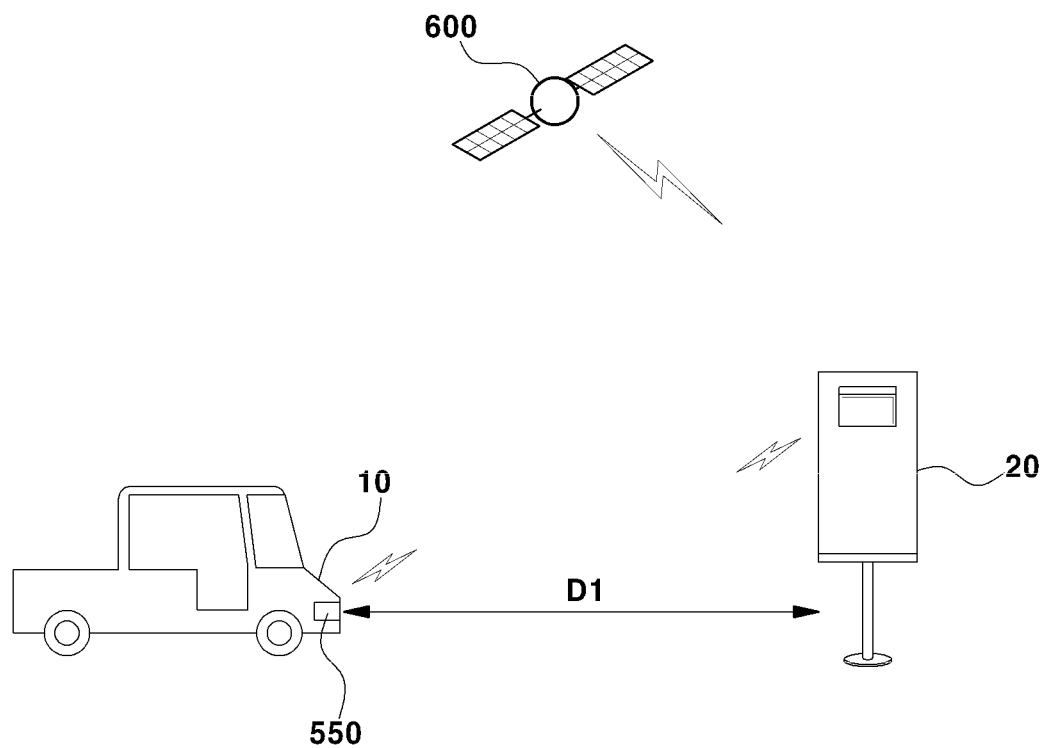
FIG. 3 is a diagram for describing a management strategy of a vehicle battery according to an embodiment of the present disclosure.

FIG. 3 is a diagram for describing a management strategy of a vehicle battery according to an embodiment of the present disclosure.

Referring to FIGS. 2 and 3, a communication module 550 may be mounted in the electric vehicle 10. The communication module 550 may receive information on a location of the electric charging station 20. The electric charging station 20 may transmit location information of the electric charging station 20 to the communication module 550. The electric charging station 20 is to be disposed in a specified space such as a logistics warehouse, a golf course, or a resort, and may be disposed at a predetermined location. The controller 500 may receive information on a current location of the electric vehicle 10 from a location recognition device 600. For example, the location recognition device 600 may include a GPS device and a device capable of recognizing movement in a space in which the electric vehicle 10 is specified. The controller 500 may determine a first distance D1 between the current location of the electric vehicle 10 and the electric charging station 20 based on information received from the location recognition device 600 and the communication module 550.

The controller 500 may calculate the range of the electric vehicle 10 based on the SOC of the first battery unit 110, and calculate the amount of power with which the first battery unit 110 is charged based on the SOC or the range of the first battery unit 110 and the first distance D1 between the electric vehicle 10 and the electric charging station 20.

As an example, when the electric vehicle 10 is being driven or is scheduled to be driven, the controller 500 may supply the power stored in the second battery unit 130 to the first battery unit 110 or directly to the motor 300. Accordingly, the electric vehicle 10 may reach the electric charging station 20.

As an example, when the electric vehicle 10 is put into the work site and is supplying power to the external equipment 30, the controller 500 may supply the power stored in the first battery unit 110 to the second battery unit 130 or directly to the external equipment 30. In this instance, the controller 500 may calculate the amount of power required for the electric vehicle 10 to reach the electric charging station 20 in consideration of the first distance D1 between the electric vehicle 10 and the electric charging station 20. The lower limit of charging of the first battery unit 110 may be determined based on the amount of power. When the SOC of the first battery unit 110 is less than the lower limit of charging, the electric vehicle 10 may not be able to reach the electric charging station 20. The controller 500 may supply power supplied from the first battery unit 110 to the second battery unit 130 or the external port 400 until the SOC of the first battery unit 110 reaches the lower limit of charge.

As another example, a plurality of electric charging stations 20 may be disposed in a specified space in which the electric vehicle 10 is driven and is put to work. The plurality of electric charging stations 20 may be disposed at different locations. The communication module 550 may receive information on locations of the plurality of electric charging stations 20. The controller 500 may calculate a distance between a current location of each of the plurality of electric charging stations 2 and the electric vehicle 10 and the amount of power required when the electric vehicle 10 reaches each of the plurality of electric charging stations 20. The controller 500 may set an electric charging station 20 having a close distance to the electric vehicle 10 among the plurality of electric charging stations 20 as a destination. In addition, the controller 500 may set any one of the electric charging stations 20 as the destination in consideration of the destination after charging of the electric vehicle 10. The controller 500 may determine which electric charging station 20 to set as a destination based on information on a schedule of the electric vehicle 10.

According to an embodiment of the present disclosure, the controller 500 may control the second battery unit 130 by determining whether the electric vehicle 10 can be driven to the electric charging station 20 disposed at a fixed location in a specified space. Accordingly, the amount of power supplied by the electric vehicle 10 to the external equipment 30 may be determined based on the distance between the electric vehicle 10 and the electric charging station 20.

Figure 4:
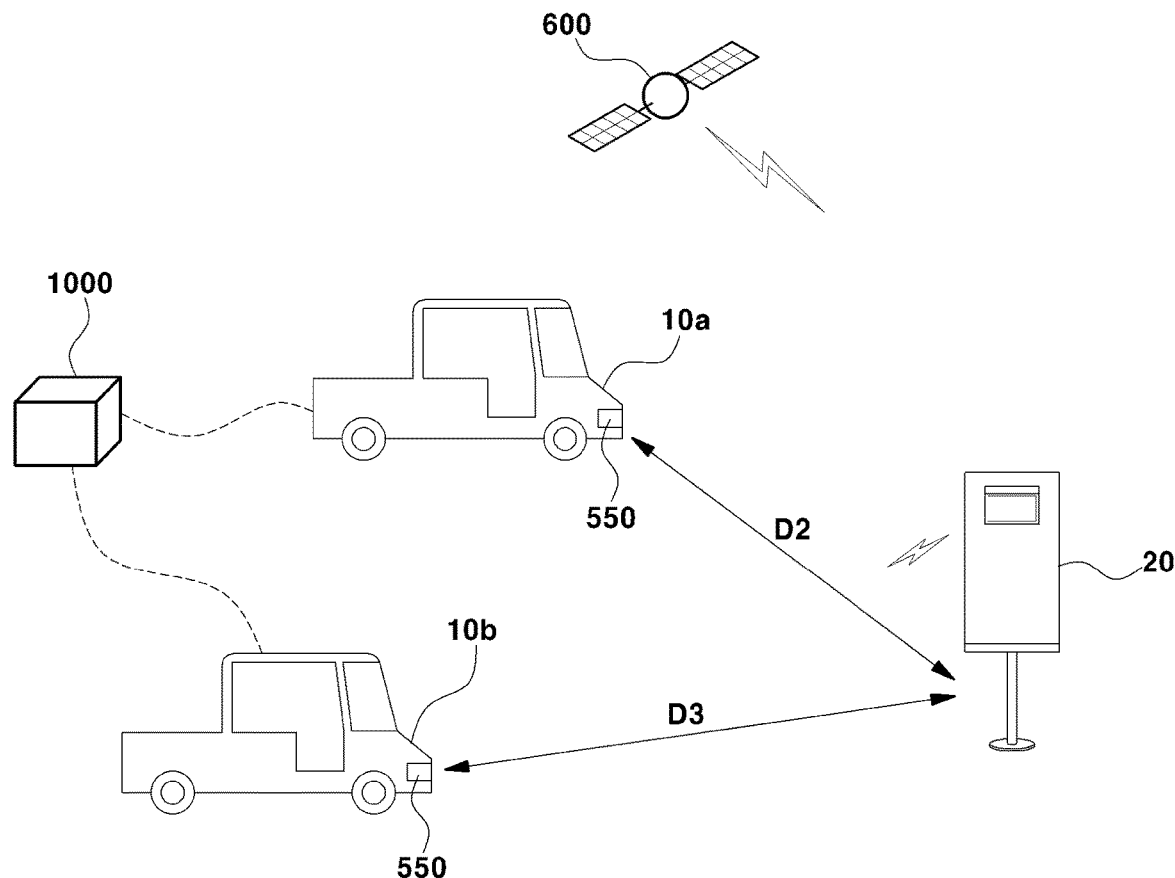
FIG. 4 is a diagram for describing a management strategy of vehicle batteries of a plurality of electric vehicles according to an embodiment of the present disclosure.

FIG. 4 is a diagram for describing a management strategy of vehicle batteries of a plurality of electric vehicles according to an embodiment of the present disclosure.

Referring to FIGS. 2 and 4, a plurality of electric vehicles 10a and 10b may be disposed in a specified space. The controller 500 and the communication module 550 may be mounted in each of the electric vehicles 10a and 10b. The communication module 550 may transmit the SOCs of the first battery unit 110 and the second battery unit 130 of each of the electric vehicles 10a and 10b to an integrated control center 1000. The integrated control center 1000 may monitor the SOC of each of the plurality of electric vehicles 10a and 10b and the locations of the plurality of electric charging stations 20 in real time.

As an example, the integrated control center 1000 may transmit a signal for a driving route for charging to each of the electric vehicles 10a and 10b in consideration of the SOC of the first battery unit 110 of each of the electric vehicles 10a and 10b and the locations of the electric charging stations 20. The integrated control center 1000 may determine a driving schedule of the plurality of electric vehicles 10a and 10b in a specified space and monitor the locations of the electric vehicles 10a and 10b in real time. In addition, the integrated control center 1000 identifies the locations of the electric charging stations 20. That is, the integrated control center 1000 may allocate the electric vehicles 10a and 10b so that each of the electric vehicles 10a and 10b is driven to an electric charging station 20 close to each of the electric vehicles 10a and 10b. For example, when a second distance D2 between the first electric vehicle 10a and the electric charging station 20 is shorter than a third distance D3 between the second electric vehicle 10b and the electric charging station the integrated control center 1000 may allocate the first electric vehicle 10a to the electric charging station 20. After the integrated control center 1000 allocates the first electric vehicle 10a to the electric charging station 20, the controller 500 may calculate a target to which the second battery unit 130 supplies power and the amount of power to be supplied in consideration of the SOC of the first battery unit 110 and the locations of the electric charging stations 20. For example, when there is difficulty in driving the first electric vehicle 10a to the electric charging station 20 in consideration of the SOC of the first battery unit 110, the controller 500 may perform a control operation so that power of the second battery unit 130 is used for driving the first electric vehicle 10a.

Unlike the above-described embodiments, the integrated control center 1000 may allocate the electric vehicle 10a or 10b relatively far from the electric charging station 20 to the electric charging station 20 in consideration of the driving schedule of the electric vehicles 10a and 10b and the SOC of each of the batteries of the electric vehicles 10a and 10b.

As another example, the controller 500 mounted in the electric vehicle 10a or may share the SOC of the first battery unit 110 with the controller 500 of another electric vehicle 10a or 10b located within a preset distance. Information on the SOC of each of the electric vehicles 10a and 10b in the specified space may be used to allocate an electric charging station 20 at which the electric vehicles 10a and 10b are charged. A plurality of controllers 500 may allocate the electric vehicles 10a and 10b to the electric charging stations 20 in consideration of the SOC of the first battery unit 110 of each of the electric vehicles 10a and 10b and the locations of the plurality of electric charging stations 20. For example, when the electric vehicles 10a and 10b are started, each of the controllers 500 may provide information on the SOC of the first battery unit 110 to other surrounding controllers 500. That is, a location at which the electric vehicles 10a and 10b are charged may be determined through information sharing between the plurality of controllers 500 without the integrated control center 1000.

According to an embodiment of the present disclosure, the driving schedule of the electric vehicles 10a and 10b in the specified space may be determined by the integrated control center 1000. That is, the integrated control center 1000 may determine an electric charging station 20 at which the electric vehicles 10a and 10b need to be charged, and thus it is possible to prevent consumption of a lot of time for electric charging due to a large number of electric vehicles 10a and 10b gathering at a specific electric charging station 20.

According to an embodiment of the present disclosure, even when there is no integrated control center 1000 capable of managing the plurality of electric vehicles 10a and 10b, it is possible to determine an electric charging station 20 at which the electric vehicles 10a and 10b are charged through communication between the controllers 500 mounted in the electric vehicles 10a and 10b.

Figure 5:
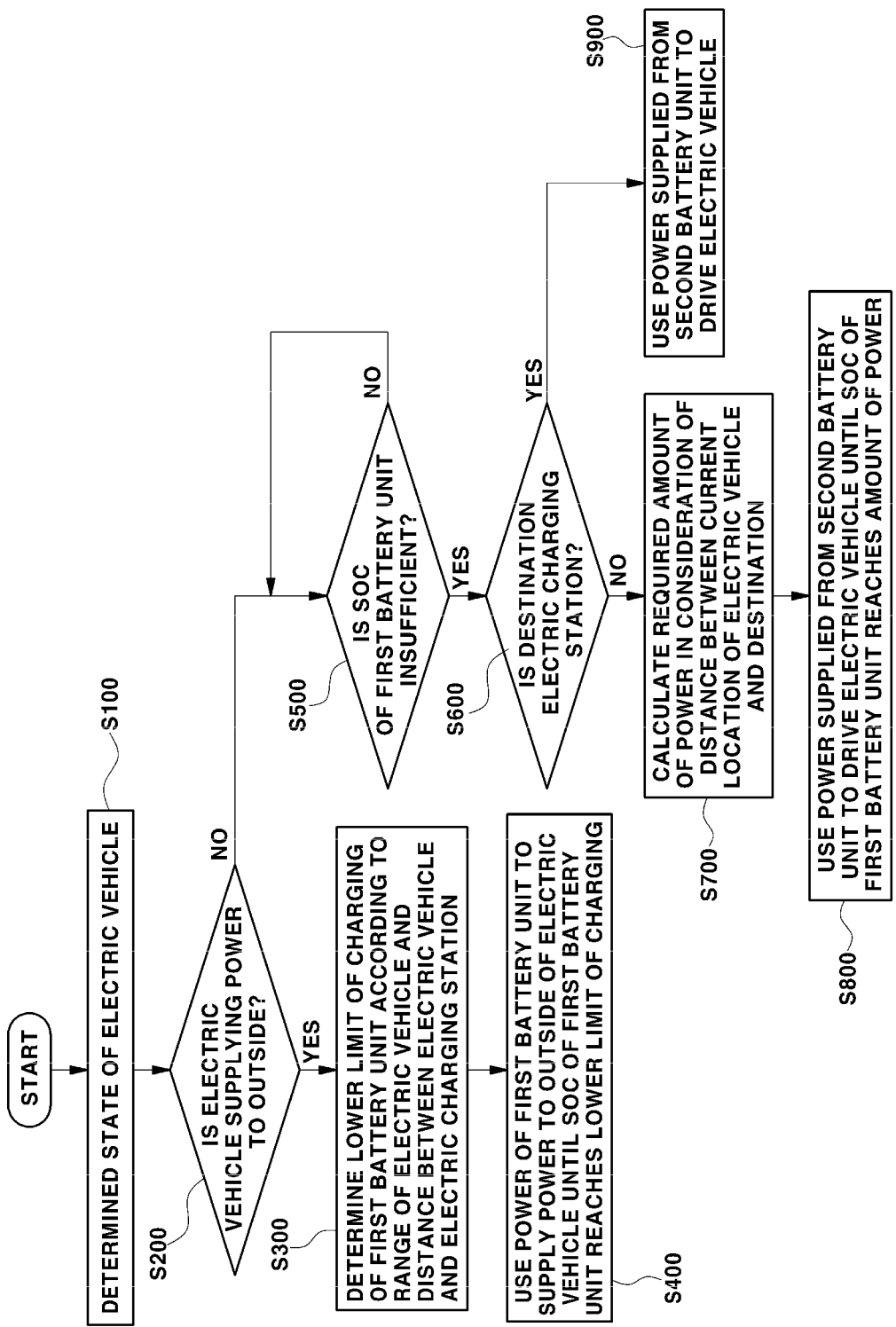
FIG. 5 is a flowchart illustrating a vehicle battery management method according to an embodiment of the present disclosure.

FIG. 5 is a flowchart illustrating a vehicle battery management method according to an embodiment of the present disclosure. For brevity of description, description of overlapping content is omitted.

Referring to FIG. 5, the controller mounted in the electric vehicle and the integrated control center may determine a state of the electric vehicle. The state of the electric vehicle may include whether the electric vehicle is supplying power to the outside, whether the electric vehicle is started, whether the electric vehicle is being driven, and the location of the electric vehicle (S100).

The controller may determine whether the electric vehicle is supplying power to the outside. When the electric vehicle is supplying power to the outside, the controller may determine whether to supply the power stored in the first battery unit to the second battery unit or the external port (S200).

When the electric vehicle is supplying power to the outside, the controller may determine a lower limit of charging of the first battery unit according to the range of the electric vehicle and the distance between the electric vehicle and the electric charging station. The lower limit of charging may be determined based on the minimum amount of power required for the electric vehicle to reach the electric charging station (S300).

The controller may perform a control operation so that power of the first battery unit is used to supply power to the outside of the electric vehicle until the SOC of the first battery unit reaches the lower limit of charging. Specifically, the controller may supply power from the first battery unit to the second battery unit or the external port. Accordingly, while the maximum power may be supplied to the outside in a space where the electric vehicle is currently working, power enabling the electric vehicle to be driven to the electric charging station may remain in the first battery unit (S400).

When the electric vehicle is being driven instead of supplying power to the outside, the controller may monitor the SOC of the first battery unit, which is a battery for driving. That is, the controller may determine whether the SOC of the first battery unit is sufficient for the electric vehicle to reach the destination. When the SOC of the first battery unit is sufficient for the electric vehicle to reach the destination, the controller may not use the power of the second battery unit for driving of the electric vehicle (S500).

When the SOC of the first battery unit is insufficient for the electric vehicle to reach the destination, the controller may determine whether the destination is the electric charging station or another work space (S600).

When the destination is another work space, the controller may calculate the amount of power required for driving in consideration of the distance between the current location of the electric vehicle and the destination (S700).

The controller may use power supplied from the second battery unit to drive the electric vehicle until the SOC of the first battery unit reaches the amount of power. When the destination is another work space, power may be supplied to the external equipment after the electric vehicle arrives at the work space. Accordingly, power that can be supplied to the external equipment needs to be sufficiently stored in the second battery unit of the electric vehicle. In preparation for the time after the electric vehicle arrives at the work space, the controller may perform a control operation so that only power sufficient to allow the electric vehicle to arrive at the destination may be supplied from the second battery unit to the first battery unit or the motor (S800).

When the destination is the electric charging station, the controller may use power supplied from the second battery unit to drive the electric vehicle. That is, when the electric vehicle reaches the electric charging station, the first battery unit and the second battery unit may be charged. Accordingly, the controller may perform a control operation so that power of the second battery unit is used for driving of the electric vehicle until the limit value is all or minimally reached (S900).

According to an embodiment of the present disclosure, the user may use the electric vehicle for various purposes by dividing a battery into a battery required for driving the electric vehicle and a battery required for work.

According to an embodiment of the present disclosure, a subject to which power stored in the first battery unit and the second battery unit is supplied may be determined in consideration of the distance between the electric vehicle and the destination, the type of destination, and the SOC of the battery unit. Accordingly, when the power stored in the battery unit is sufficient, power may be distributed according to uses of the first battery unit and the second battery unit, and when the power stored in the battery unit is insufficient, power distribution/supply between the first battery unit and the second battery unit may be controlled.

According to an embodiment of the present disclosure, the controller may control the second battery unit by determining whether the electric vehicle can be driven to the electric charging station disposed at a fixed location in a specified space. Accordingly, the amount of power supplied by the electric vehicle to the external equipment may be determined based on the distance between the electric vehicle and the electric charging station.

According to an embodiment of the present disclosure, the driving schedule of the electric vehicles in the specified space may be determined by the integrated control center. That is, the integrated control center may determine an electric charging station at which the electric vehicles need to be charged, and thus it is possible to prevent consumption of a lot of time for electric charging due to a large number of electric vehicles gathering at a specific electric charging station.

According to an embodiment of the present disclosure, even when there is no integrated control center capable of managing the plurality of electric vehicles, it is possible to determine an electric charging station at which the electric vehicles are charged through communication between the controllers mounted in the electric vehicles.

Although the embodiments of the present disclosure have been described above with reference to the accompanying drawings, those of ordinary skill in the art to which the present disclosure pertains will understand that the present disclosure may be embodied in other specific forms without changing the technical spirit or essential features thereof. Therefore, it should be understood that the embodiments described above are illustrative in all respects and not restrictive.

What is claimed is:

1. A vehicle battery management system comprising:
    a battery unit configured to supply power to an electric vehicle; and
    a controller configured to control the battery unit, wherein:
    the battery unit is divided into a first battery unit and a second battery unit;
    the first battery unit supplies power to a motor for generating driving force of the electric vehicle;
    the second battery unit supplies power to an outside of the electric vehicle;
    the controller performs a control operation so that power supplied from the first battery unit is supplied to the outside of the electric vehicle or power supplied from the second battery unit is supplied to the motor based on a state of charge (SOC) of each of the first battery unit and the second battery unit and state information of the electric vehicle; and
    the state information of the electric vehicle includes whether the electric vehicle is being driven, whether the electric vehicle is stopped, and a distance between the electric vehicle and an electric charging station.

2. The vehicle battery management system of claim 1, wherein the first battery unit and the second battery unit are configured as separate battery packs.

3. The vehicle battery management system of claim 1, wherein the first battery unit and the second battery unit are configured as separate modules in one battery pack.

4. The vehicle battery management system of claim 1, wherein the second battery unit supplies power to an attachment attached to the electric vehicle and another vehicle.

5. The vehicle battery management system of claim 1, wherein:
    the controller supplies power supplied from the second battery unit to the motor or the first battery unit upon determining that the SOC of the first battery unit is insufficient in consideration of a range of the electric vehicle and a distance between a current location of the electric vehicle and a destination; and
    the range is determined based on the SOC of the first battery unit.

6. The vehicle battery management system of claim 5, wherein, when a destination of the electric vehicle is the electric charging station, the controller supplies power supplied from the second battery unit to the first battery unit or the motor.

7. The vehicle battery management system of claim 5, wherein:
    when a destination of the electric vehicle is not the electric charging station, the controller calculates an amount of power required for the electric vehicle to reach the destination; and the controller supplies power supplied from the second battery unit to the first battery unit until the SOC of the first battery unit reaches the amount of power.

8. The vehicle battery management system of claim 5, wherein:
when a destination of the electric vehicle is not the electric charging station, the controller calculates an amount of power required for the electric vehicle to reach the destination; and
the controller compares the SOC of the first battery unit with the amount of power and supplies an insufficient amount of power from the second battery unit to the motor.

9. The vehicle battery management system of claim 1, wherein:
in a state in which the second battery unit supplies power to the outside of the electric vehicle, the controller determines a lower limit of charging of the first battery unit determined in consideration of a range of the electric vehicle and a distance between a current location of the electric vehicle and the electric charging station;
the range is determined based on the SOC of the first battery unit; and
the lower limit of charging is determined based on a minimum amount of power required for the electric vehicle to reach the electric charging station.

10. The vehicle battery management system of claim 9, wherein the controller supplies power supplied from the first battery unit to the second battery unit or to the outside of the electric vehicle until the SOC of the first battery unit reaches the lower limit of charging.

11. The vehicle battery management system of claim 1, further comprising:
a location recognition device configured to acquire information on a current location of the electric vehicle; and
a communication module configured to receive information on a location of the electric charging station,
wherein the controller determines a distance between a current location of the electric vehicle and the electric charging station based on information received from the location recognition device and the communication module.

12. The vehicle battery management system of claim 11, wherein:
the communication module receives information on locations of a plurality of electric charging stations; and
the controller calculates a distance between each of the plurality of electric charging stations and the current location of the electric vehicle, and an amount of power required when the electric vehicle reaches each of the plurality of electric charging stations.

13. The vehicle battery management system of claim 1, further comprising a communication module configured to transmit the SOC of each of the first battery unit and the second battery unit of the electric vehicle to an integrated control center.

14. The vehicle battery management system of claim 13, wherein:
the integrated control center monitors an SOC of each of a plurality of electric vehicles and a location of each of a plurality of provided electric charging stations in real time; and
the integrated control center transmits a signal for a driving route for charging to the electric vehicles in consideration of an SOC of the first battery unit of each of the electric vehicles and the locations of the electric charging stations.

15. The vehicle battery management system of claim 1, wherein the controller shares the SOC of the first battery unit with controllers of other electric vehicles within a preset distance.

16. The vehicle battery management system of claim 15, wherein the controllers allocate the electric vehicles to a plurality of electric charging stations in consideration of the SOC of the first battery unit of each of the electric vehicles and locations of the electric charging stations.

17. The vehicle battery management system of claim 16, wherein each of the controllers provides information on the SOC of the first battery unit to other surrounding controllers when the electric vehicles are started.

\* \* \* \* \*